(12) United States Patent
Vaxelaire et al.

(10) Patent No.: US 7,891,674 B2
(45) Date of Patent: Feb. 22, 2011

(54) TORSIONALLY FLEXIBLE AXLE WITH ACTIVE CONTROL OF THE STEERING ANGLE USING A HYDROELASTIC JOINT

(75) Inventors: Alain Vaxelaire, Romagnat (FR); Xavier Neau, Clemont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 94 days.

(21) Appl. No.: 12/515,704

(22) PCT Filed: Nov. 20, 2007

(86) PCT No.: PCT/EP2007/062551

§ 371 (c)(1),
(2), (4) Date: May 20, 2009

(87) PCT Pub. No.: WO2008/061973

PCT Pub. Date: May 29, 2008

(65) Prior Publication Data

US 2010/0052271 A1    Mar. 4, 2010

(30) Foreign Application Priority Data

Nov. 21, 2006  (FR) .................................. 06 10210

(51) Int. Cl.
*B62D 17/00*     (2006.01)

(52) U.S. Cl. ............................... 280/5.524; 280/86.758
(58) Field of Classification Search ................ 280/5.52, 280/5.521, 5.522, 5.523, 5.524, 5.516, 86.758; B60G 3/26; B62D 9/04

See application file for complete search history.

(56) References Cited

FOREIGN PATENT DOCUMENTS

| EP | 1 405 740 | | 4/2004 |
|---|---|---|---|
| FR | 2 855 459 | | 12/2004 |
| FR | 2906856 | A1 * | 4/2008 |
| JP | 62 184249 | | 8/1987 |
| JP | 2002 012015 | | 1/2002 |
| WO | WO 97/31794 | | 9/1997 |

* cited by examiner

*Primary Examiner*—Paul N Dickson
*Assistant Examiner*—Keith Frisby
(74) *Attorney, Agent, or Firm*—Cohen Pontani Lieberman & Pavane LLP

(57) ABSTRACT

A suspended axle for a motor vehicle comprising a torsionally flexible beam (1), in which axle each wheel carrier (5) is mounted via a pivot (16) and, some distance away from the pivot, via a wheel-steering device, the steering device comprising a hydroelastic articulation, the device further comprises a steering operating system, the system comprising means designed to vary the volume of an incompressible fluid so as to bring about the steering of the wheel (2).

17 Claims, 5 Drawing Sheets

TORSIONALLY FLEXIBLE AXLE WITH ACTIVE CONTROL OF THE STEERING ANGLE USING A HYDROELASTIC JOINT

RELATED APPLICATIONS

This is a U.S. National Phase Application under 35 USC 371 of International Application PCT/EP2007/062551, filed on Nov. 20, 2007.

This application claims the priority of French patent application no. 06/10210 filed Nov. 21, 2006, the subject matter of which is hereby incorporated by reference.

FIELD OF THE INVENTION

The invention relates to a suspended axle for a motor vehicle, and more specifically to an axle comprising a torsionally flexible beam and an operating device for bringing about the steering of the wheels.

BACKGROUND OF THE INVENTION

Axles such as this more specifically find applications in suspending and supporting the rear wheels of motor vehicles. Specifically, under cornering, the rear wheels of a vehicle experience lateral forces in the direction of the corner and these have to be controlled in order to improve the cornering and stability of the vehicle.

A torsionally flexible axle with active control of the steering angle using a telescopic actuator is known, particularly from document WO-2004/089665. However, that solution is not optimal particularly in relation to the constraints on space near the wheel and in relation to the precision with which the steering angle can be controlled.

SUMMARY OF THE INVENTION

One object of the present invention is to provide a torsionally flexible axle with active control of the steering angle that anticipates incorporating the steering pivot function and the function of actuating rotation about the said pivot into the wheel carrier, the actuation being achieved by means of a steering device with a hydroelastic articulation.

This and other objects are attained in accordance with one aspect of the invention directed to a suspended axle for a motor vehicle comprising a torsionally flexible beam each of the ends of which carries a rigid arm comprising means of articulation relative to the bodyshell of the vehicle so as to allow suspension travel, the arm further bearing a wheel carrier, in which axle each wheel carrier is mounted on each arm via a pivot and, some distance away from the pivot, via a wheel-steering device, the steering device comprising a hydroelastic articulation comprising an outer body and a member housed in the body, the body being secured to either the arm or the wheel carrier and the member being secured respectively to either the wheel carrier or the arm, the articulation further comprising an elastically deformable element which is interposed between the member and the body, the element being configured to form at least two sealed chambers between, respectively, a part of the element and the interior surface of the body, each of the chambers being designed to allow, through compression/expansion of the chambers, movements of the member relative to the outer body, the steering device further comprises a steering operating system, the system comprising means designed to vary the volume of an incompressible fluid present in each respective one of the chambers so as to bring about the movements of the member and thus the steering of the wheel relative to the arm.

DETAILED DESCRIPTION OF THE DRAWINGS

Figure 1:
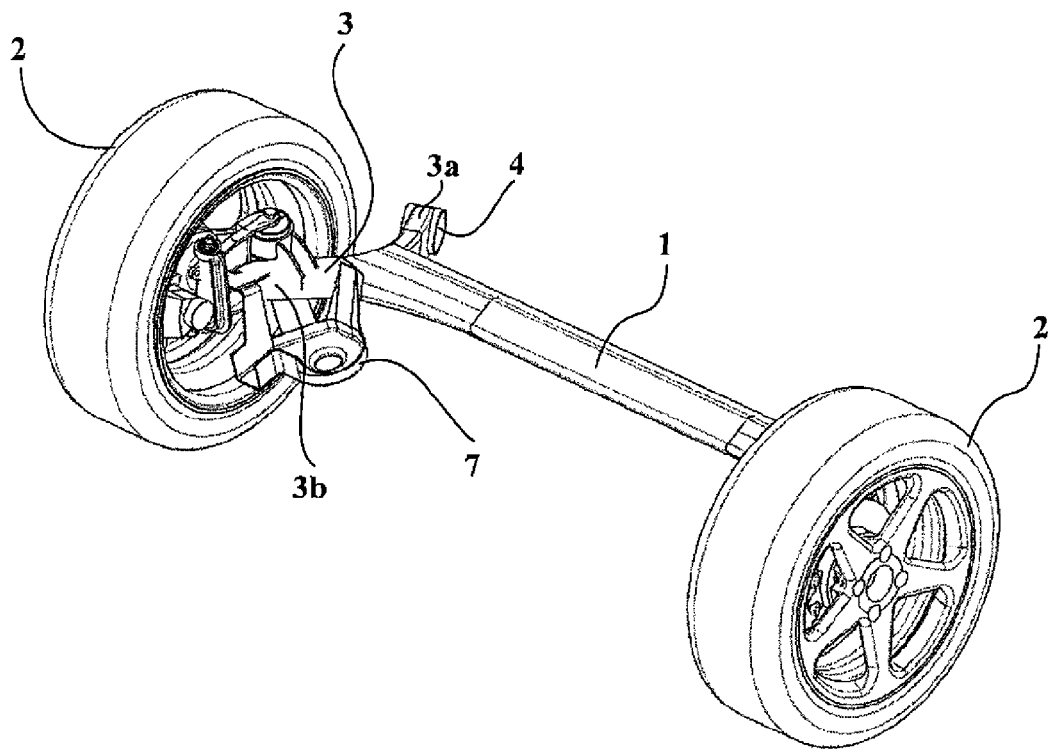
FIG. 1 is a perspective view of an axle according to one embodiment of the invention, on which two wheels are mounted such that they can rotate.

The steering angle of a wheel is defined as being the angle separating, in a horizontal plane parallel to the ground, the plane of the wheel from the mid-plane of the vehicle. The plane of the wheel is the plane, associated with the wheel, which is perpendicular to the axis of the wheel and passes through the centre of the contact patch via which the vehicle makes static contact with the ground when the wheel is vertical. The plane of the wheel is thus integral with the axis of the wheel and its orientation varies with that of the wheel. During steering, the front of the wheel moves inwards or outwards and is therefore said to toe-in or to toe-out, respectively.

Besides the steering angle, the angular position of the plane of the wheel with respect to the bodyshell of the vehicle is defined by the camber angle of a wheel which is the angle separating, in a transverse plane perpendicular to the ground, the plane of the wheel from the mid-plane of the vehicle.

The invention proposes a suspended axle for a motor vehicle comprising a torsionally flexible beam 1 and of the type with active control of the steering angle of the wheels 2 mounted on the said axle.

For preference, the axle according to the invention is configured in such a way that steering is safe when the steering actuator is inactive or has failed, that is to say that the wheels of the axle have at least the same amount of toe-in as is found on conventional torsionally flexible axles. In such instances, the action of the steering device is intended to realign the wheels in order to achieve settings without toe-in (wheels parallel) which are highly favourable in terms of tyre wear and fuel consumption but which are not practical from the point of view of vehicle handling on the limit or in emergency avoidance manoeuvres. Thus, complete failure or limited operation of the actuator has no impact on vehicle safety. The reverse logic (whereby the axle might, on the other hand, be configured to keep the wheels parallel when there is no action on the steering device) is entirely conceivable but demands that correct actuator operation be guaranteed under all driving circumstances.

One embodiment of a suspended axle each of the ends of the beam 1 of which bears a rigid arm 3 comprising means of articulation with respect to the bodyshell of the vehicle (which bodyshell has not been depicted) so as to allow suspension travel is described in conjunction with the figures. In the embodiment depicted, the means of articulation is formed of a bore 4 of axis 4a in which a complementary component associated with the bodyshell is intended to be inserted. Furthermore, the means of articulation is borne by a first part 3a of the arm 3.

As far as the torsionally flexible beam 1 is concerned, the invention is not limited to a particular embodiment. For example, a beam such as this may be produced on the basis of the teachings of documents EP-0 904 211 or EP-1 265 763 in which documents two coaxial tubes are designed to be able to exhibit elastic angular travel of one relative to the other. A torsionally flexible beam 1 according to document FR-2 840 561 may also be used in the context of the invention.

Each end of the beam further bears a wheel carrier 5 which is secured to the said end via a second part 3b of the rigid arm 3. In the embodiment depicted, the arm 3 has an outwardly curved shape the central region of which is secured to the end of the beam 1 by insetting, each part 3a, 3b extending on a respective side of the central region. However, other configurations may be envisaged; for example the beam 1 may be secured to the front or to the rear of the arm 3. The beam 1 connects the arms 3 in order firstly to provide lateral guidance and secondly to provide the axle with anti-roll stiffness.

Furthermore, the second part 3b also bears a component 7 intended to support the spring and the shock absorber (neither of which has been depicted) of the wheel 2. The component 7 has a housing 8 on which the said spring can rest, a yoke intended to accept the said shock absorber and attachment lugs 9 which are fixed to the second part 3b in order to position the component 7 on the inside of the arm 3.

Figure 2:
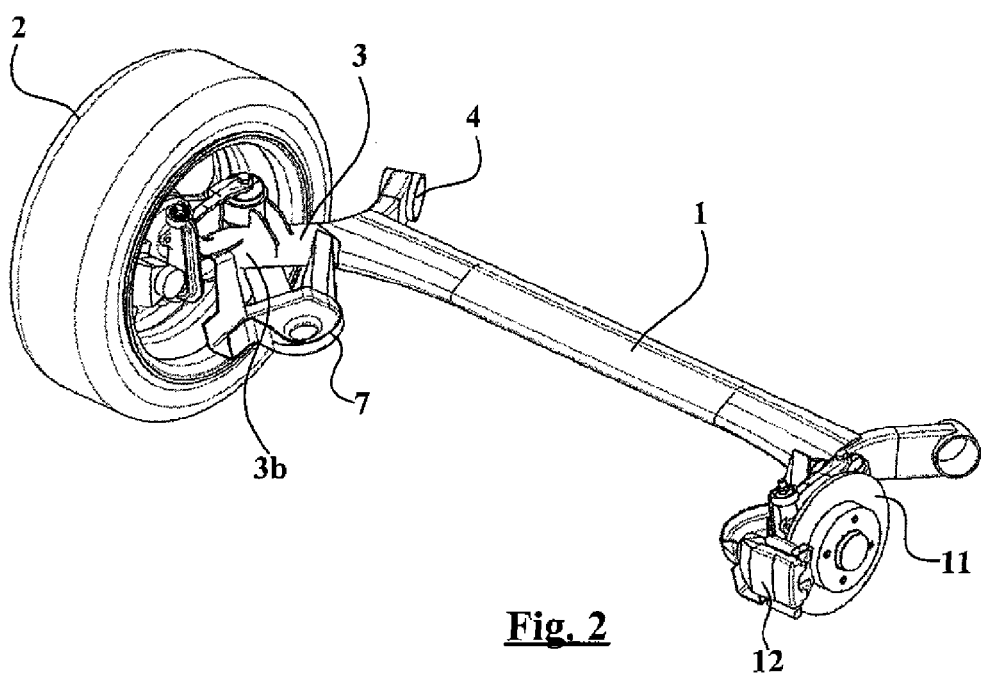
FIGS. 2 and 3 are views similar to that of FIG. 1 in which one wheel has been removed (FIG. 2), and one wheel and the braking system have been removed, respectively.
Figure 3:
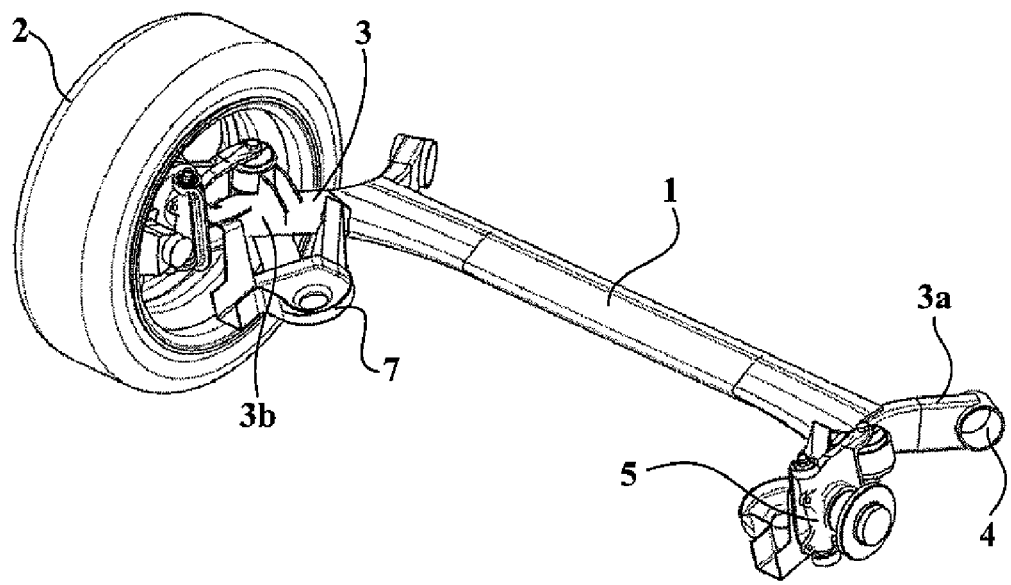
Figure 4:
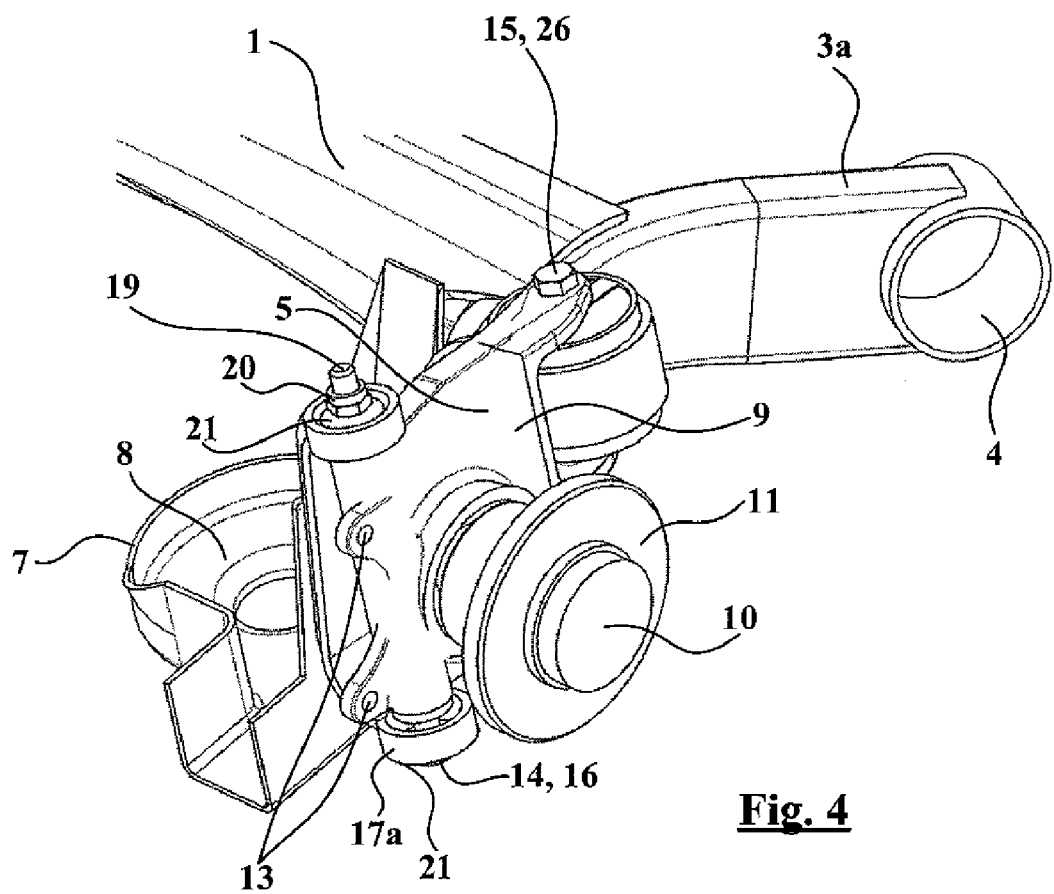
FIGS. 4 and 5 are enlarged depictions of one end of the axle of the embodiment of FIG. 1, viewed from two different angles respectively.
Figure 5:
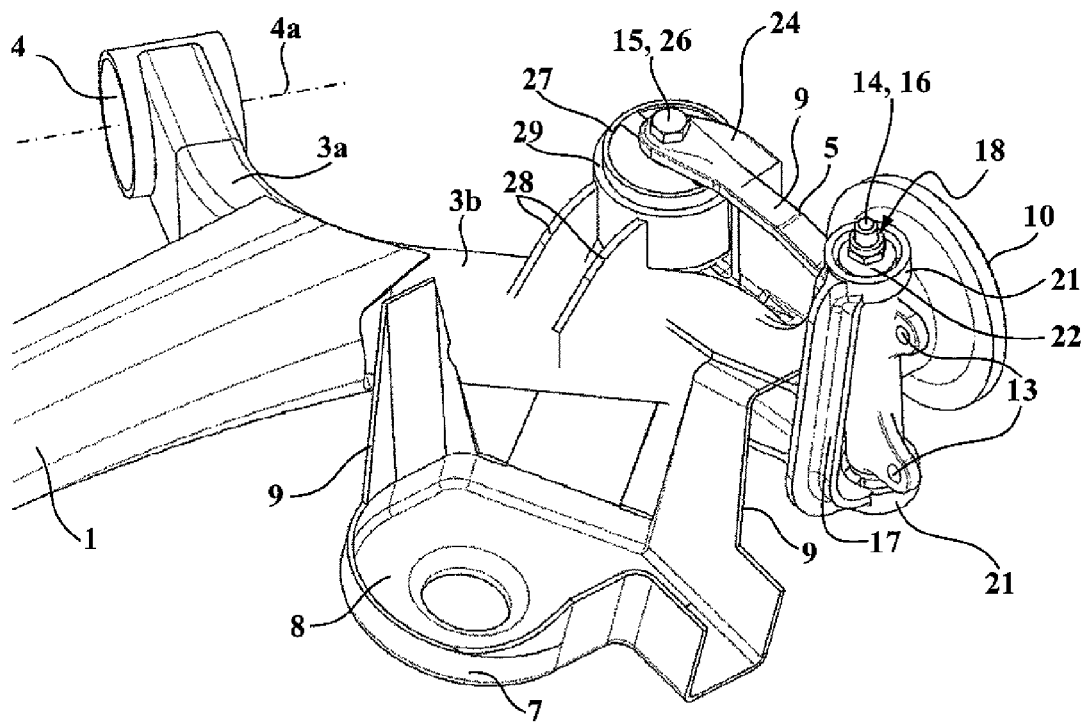

The wheel carrier 5 comprises a rigid mounting plate 9 of substantially parallelepipedal shape the central part of which comprises the means of attachment of the wheel in the form of a hub 10 on which the brake disk 11 and the wheel 2 are mounted such that they can rotate. Furthermore, FIG. 2 shows the layout of the brake caliper 12 relative to the mounting plate 9 via two attachment holes 13. Thus, the wheel 2 and the braking system 11, 12 are secured to the mounting plate 9 such that they move as one therewith, the wheel 2 and the disk 11 incidentally being capable of rotating relative to the said mounting plate.

The mounting plate 9 further bears, on each side of the hub, two substantially vertical axes 14, 15. The distance between the axes 14, 15 dictates the steering angle that can be achieved for a given steering actuator travel, for example, a dimension of 100 mm allows a steering angle of the order of 3° for a travel of 5 mm.

A first axis 14 is formed near the attachment holes 13 for the brake caliper 12 so as to form a pivot 16 for articulation between the wheel carrier 5 and the end of the second part 3b. The pivot 16 is thus designed to allow the wheel 2 to be steered relative to the bodyshell of the vehicle.

In the embodiment depicted, the pivot 16 comprises a yoke 17 secured to the end of the arm 3, the said yoke comprising two lugs 17a each provided with a housing clamping from either side a hole 18 that passes through the end of the mounting plate 9. Furthermore, a pin 19 is inserted in the hole 18, the said pin being prevented from rotating with respect to the arm 3 by means of a respective nut 20.

The pivot 16 comprises two elastic articulations 21 which are provided one on each side of the wheel carrier 5 so as to introduce elastic filtration into the pivot function. To do this, an elastically deformable element 22 is interposed between the interior surface of each housing and the exterior surface of the hole 18 positioned opposite. In order to maximize the camber rigidity under lateral forces and torques, the two articulations 21 are as widely spaced as possible.

Figure 8:
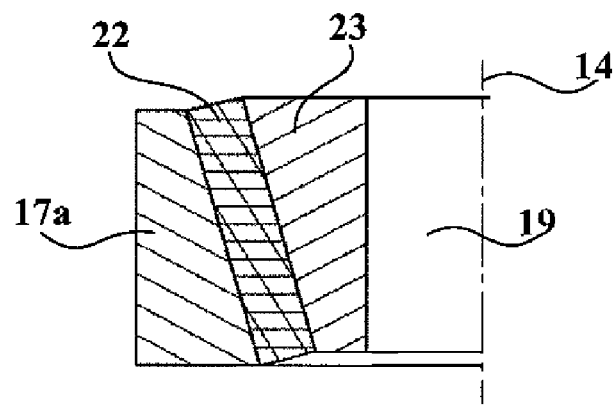
FIG. 8 is a schematic depiction in longitudinal section of the layout of an elastically deformable element in an articulation of the pivot of an axle according to the invention.
Figure 9A:
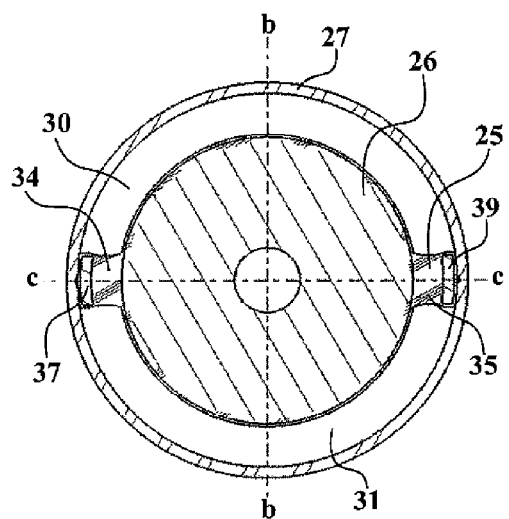
FIGS. 9 are views respectively in cross section (FIG. 9a), in longitudinal section on b-b (FIG. 9b), in longitudinal section on c-c (FIG. 9c) and in perspective with cut away (FIG. 9d) of the hydroelastic articulation provided in the embodiment of FIG. 1.
Figure 9B:
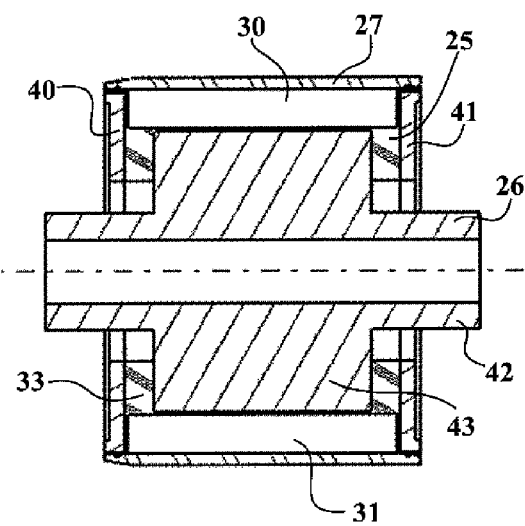
Figure 9C:
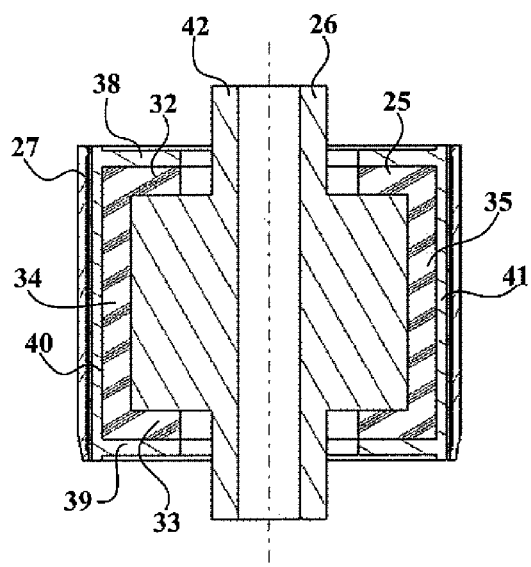
Figure 9D:
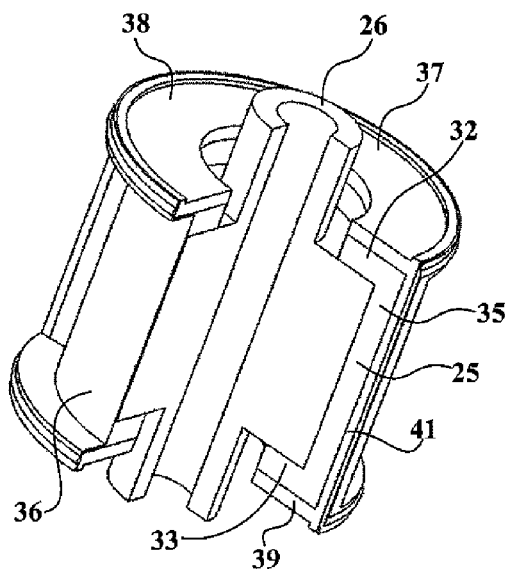

The structure of an elastic articulation 21 which is dimensioned in such a way as to transmit the various components of the base torsor of the wheel 2 while controlling the various distances: high radial and axial stiffness and low torsional stiffness in order to minimize the steering torque, is described hereinbelow in conjunction with FIG. 8.

The elastically deformable element 22 has a generatrix the axis of which is inclined with respect to the axis of rotation 14 of the pivot 16. Furthermore, lamination is formed with a rigid component 23 so as to obtain the abovementioned rigidities. For example, an articulation 21 with a radial stiffness in excess of 10 000 N/mm, high conical stiffness and high axial loading capacity can be obtained.

According to an embodiment that has not been depicted, the pivot may be rigid with pure free torsion properties. For example, the pivot may comprise mechanical articulations of the plain bearing, rolling-contact bearing or thrust bearing type.

On the opposite side to the pivot 16, the mounting plate 9 comprises a yoke 24 in which a device for steering the wheel 2 is attached. The steering device comprises a hydroelastic articulation comprising an elastically deformable element 25 which is interposed between a member 26 and an outer body 27 in which the said member is housed.

In the embodiment depicted, the body 27 is secured to the second part 3b of the arm 3 via two lugs 28 which emanate from a housing 29 of the body 27, the said lugs being fixed to the said second part. The mounting plate 9 is secured to the member 26 in such a way as to cause the mounting plate 9 to rotate about the pivot 16. However, the reverse configuration could be envisaged, namely the configuration whereby the body 27 is secured to the mounting plate 9 and the member 26 secured to the arm 3.

The pivot 16 and the steering device are offset towards the inside of the wheel 2, and the pivot 16 is inclined in such a way that its axis 14 intersects the plane of the ground near the mid-plane of the wheel. In addition, when the axle is bearing its reference load, the intersection between the axis 14 of the pivot 16 and the ground preferably lies to the rear of the axis of the wheel, for example by a distance substantially equal to the caster of the tyre, so as to minimize the energy needed for steering.

In order to allow relative movements between the member 26 and the body 27, and therefore allow the wheel 2 to be steered with respect to the arm 3, the elastically deformable element 25 is configured such that it comprises at least two sealed chambers 30, 31 between, respectively, a part of the said element and the interior surface of the said body.

One embodiment of a hydroelastic articulation in which small size, optimal elastic stiffness properties, maximized travel and good endurance can be combined is described hereinbelow with reference to FIG. 9.

The outer body 27 has a substantially cylindrical geometry open on each side of its axis so as to allow the insertion of the elastically deformable element 25 and of the member 26. The outer body 27 is rigid, for example made of a metal or of a plastic, possibly a reinforced plastic.

The elastically deformable element 25 comprises a one-piece block of elastic material exhibiting:

two rings 32, 33, these respectively being an upper ring and a lower ring, which are housed coaxially in the body 27;

two axial arms 34, 35 which extend between the rings 32, 33, the said arms being diametrically opposite one another; and a skin 36 extending circumferentially on either side of the said arms.

The elastically deformable element 25 further comprises a retaining cage 37 which is overmoulded with the block of elastic material. Thus, the elastically deformable element 25 can be produced as a single piece incorporating the various geometries mentioned hereinabove. Furthermore, the exterior surface of the cage 37 is provided with seals at the rings 32, 33 and the arms 34, 35, respectively. The seals may be overmoulded at the same time as the block of elastic material.

The cage 37 is of a geometry similar to that of the block of elastic material, that is to say of a geometry comprising two rings 38, 39 which are connected by two axial arms 40, 41. However, the cage is opened laterally between the arms 40, 41. Furthermore, the cage 37 is made of a rigid material, for example of metal or of plastic, possibly reinforced plastic. Thus, the elastically deformable element 25 combines the functions of elastically filtering loads, of transmitting steering forces from the member 26, and of sealing.

The member 26 which, like the body 27, is made of a rigid material, comprises a pin 42 which is incorporated into a cylindrical reinforcement 43. The pin 42 has a bore allowing the member 26 to be attached to each of the lugs of the yoke 24 via a nut 44. The elastically deformable element 25 is positioned around the reinforcement 43, the ends of the pin 42 projecting axially on each side of the said element and of the body 27. More specifically, the rings 32, 33 are positioned against the reinforcement 43 and axially on each side thereof, and the arms 34, 35 are also positioned against the said reinforcement and radially on each side thereof.

Once the member 26 and the element 25 have been mounted in the body 27, two sealed and opposed chambers 30, 31 are formed facing the exterior surface of the member 26. Each chamber 30, 31 is radially delimited by the interior surface of the body 27, internally delimited by the skin 36 (or by the reinforcement 43 directly when there is no skin), axially delimited by part of the flat surface of each of the rings 32, 33 which are positioned facing it, and laterally delimited by the arms 34, 35.

With this configuration, compressions/expansions of the chambers 30, 31 cause radial movements of the member 26 relative to the outer body 27. More specifically, the two chambers 30, 31 allow the member 26 to move in a radial main direction of axis b-b, the presence of the element 25 elastically filtering out forces applied to the member 26. Thus, by making the axis of the member 26 parallel to the axis 14 of rotation of the pivot 16 and by positioning the axis b-b appropriately, the radial movements of the member 26 cause the wheel 2 to be steered relative to the bodyshell of the vehicle.

Figure 6:
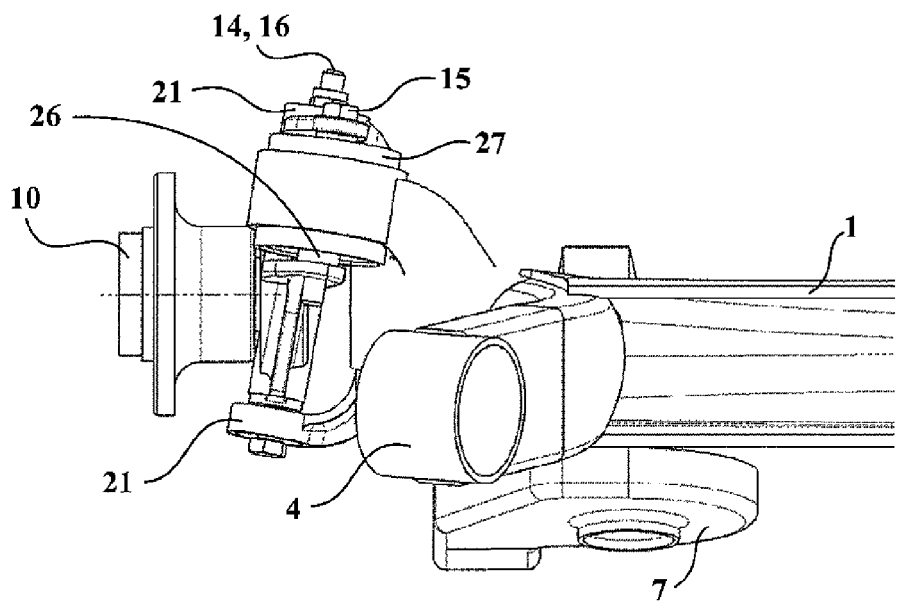
FIGS. 6 and 7 are depictions similar to those of FIGS. 4 and 5 viewed from an angle that shows the axes of the pivot and of the steering member, FIG. 7 further showing the position of the wheel relative to these axes.
Figure 7:
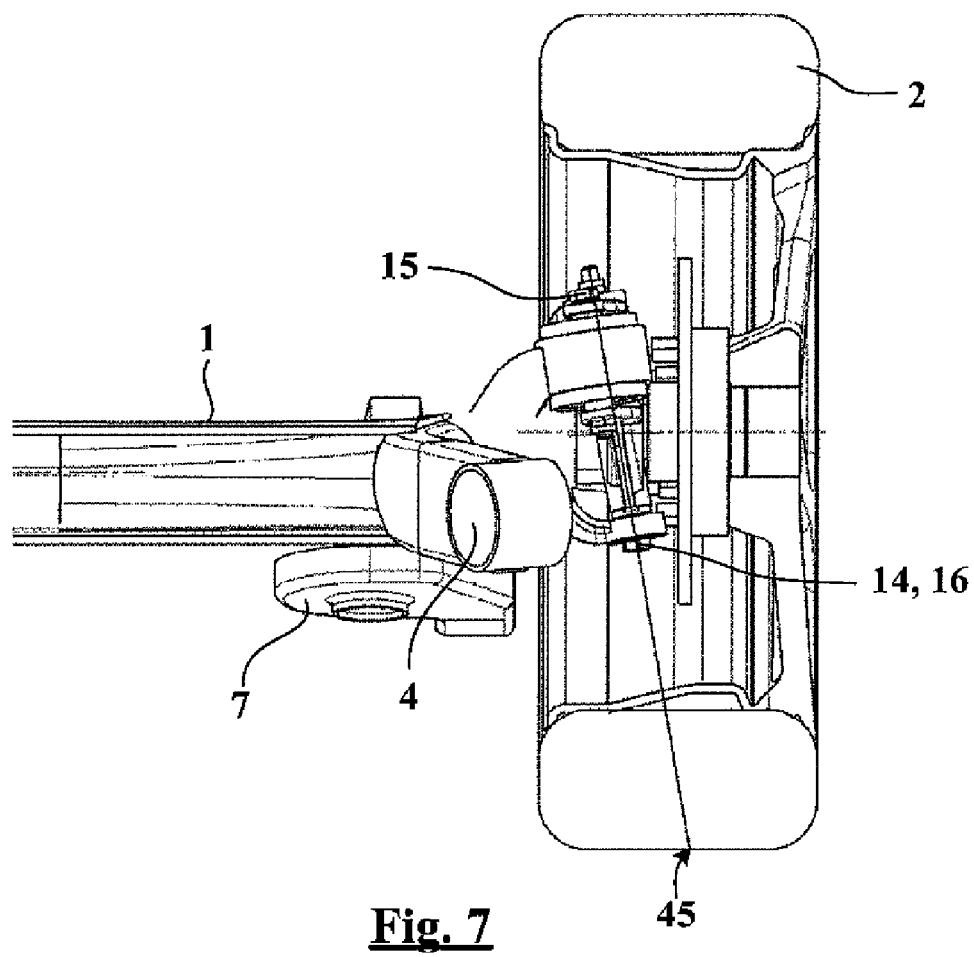

Furthermore, as shown more specifically in FIGS. 6 and 71 the axes 14, 15 of the pivot 16 and of the member 26 are inclined inwards with respect to the vertical axis. Specifically, because the axes 15, 16 are offset inwards with respect to the wheel 2, it is desirable for the said axes to be inclined by an angle chosen such that they intersect the ground near the centre of the contact patch 45 via which the tyre 2 makes static contact with the said ground.

The steering device further comprises an operating system (not depicted) for controlling the radial movements of the member 26. To do this, the operating system comprises means (not depicted) which are designed to vary the volume of an incompressible fluid present in each of the chambers 30, 31 respectively.

The steering device can be operated on the basis of various vehicle driving parameters (for example speed, longitudinal or transverse acceleration, braking force, steering wheel angle, steering wheel turn rate, torque applied to the steering wheel, roll, roll rate, roll acceleration, yaw, yaw rate, yaw acceleration, forces on the wheels, including the vertical load, type of driving or behaviour desired by the driver).

The arrangement of the hydroelastic articulation described above is particularly advantageous in that the elastically deformable element 25 is arranged in such a way that it experiences essentially shear loadings during radial movements of the member 26 relative to the body 27.

What happens is that because the rings 32, 33 are positioned coaxial with the member 26, with their surfaces secured to the body 27 and to the said member, respectively, the said rings experience essentially shear loadings.

The same is true of the arms 34, 35 which are the other parts of the element that experience the bulk of the loading, these extending axially with their interior and exterior surfaces secured to the member 26 and to the body 27, respectively.

Furthermore, because the element 25 is secured to the body 27 by the gripping on the cage 37 which keeps the regions 32-35 in contact with the said body during radial movements of the member 25, the cage 37 allows forces to be transferred to those regions of the block of elastic material which experience shear loadings.

According to the embodiment described, the elastic stiffness of the articulation when there is free flow of fluid between the chambers 30, 31 can be minimized by increasing the magnitude of the regions working in shear, particularly the axial dimension of the rings 32, 33. This increase in thickness does not have a significant detrimental effect on the expansion stiffness which remains very high thereby limiting the energy lost as a result of expansion of the chambers 30, 31 under pressure.

Indeed, for a given expansion stiffness, that is to say for the same deformable-region profile, the elastic stiffness is lower in shear than it is in tension—compression. Thus, for the same set elastic stiffness, the thickness of the deformable regions will need to be greater in shear than in tension—compression so that the expansion stiffness will be lower in the latter instance.

What this means is that this embodiment makes it possible to achieve a high ratio of radial stiffness when fluid circulation is prevented to radial stiffness when such circulation is permitted. For example, this ratio may range between 4 and 40. Further, the endurance of the steering device is also optimized, and this is achieved with the possibility of obtaining long travels, for example of the order of +/−5 mm, for the member 26.

Finally, the value of the expansion stiffness is also high, affording the following advantages:

minimizing losses of energy to elastic deformation of the chambers as a result of expansion, thus optimizing efficiency in terms of thrust;

increasing the accuracy of the steering device;

decreasing chamber fatigue and therefore improving the endurance of the elastically deformable element because there is less deformation under pressure.

Furthermore, the articulation is able to be of a small size compatible with installing it near the wheel 2. For example, the articulation may have a height and a diameter of the order of 70 mm.

The invention claimed is:

1. A suspended axle for a motor vehicle comprising a torsionally flexible beam each of the ends of which carries a rigid arm comprising means of articulation relative to the bodyshell of the vehicle so as to allow suspension travel, said arm further bearing a wheel carrier, wherein each wheel carrier is mounted on each arm via a pivot and, some distance away from said pivot, via a wheel-steering device, said steering device comprising a hydroelastic articulation comprising an outer body and a member housed in said body, said body being secured to either the arm or the wheel carrier and said member being secured respectively to either the wheel carrier or the arm, said articulation further comprising an elastically deformable element which is interposed between said member and said body, said element being configured to form at least two sealed chambers between, respectively, a part of said element and the interior surface of said body, each of the chambers being designed to allow, through compression/expansion of said chambers, movements of said member relative to the outer body, said steering device further comprises a steering operating system, said system comprising means designed to vary the volume of an incompressible fluid present in each respective one of the chambers so as to bring about the movements of the member and thus the steering of the wheel relative to the arm.

2. The suspended axle according to claim 1, wherein each of the chambers is provided facing the exterior surface of the member so as to allow, through compression/expansion of said chambers, radial movements of said member relative to the outer body, the said member being of an axis (15) parallel to the axis (14) of the pivot.

3. The suspended axle according to claim 2, wherein the axes (14, 15) of the pivot and of the member are inclined inwards with respect to the vertical axis.

4. The suspended axle according to claim 2, wherein the elastically deformable element is arranged in such as way as to experience essentially shear loadings during radial movements of the member.

5. The suspended axle according to claim 4, wherein the elastically deformable element comprises at least one ring (32, 33) which is positioned in said body coaxial with the member, the flat surfaces of said ring being secured respectively to said body and to said member so that said ring experiences essentially shear loadings during radial movements of the member.

6. The suspended axle according to claim 5, wherein the axle comprises two rings, these respectively being an upper ring and a lower ring, which are positioned axially one on each side of the member.

7. The suspended axle according to claim 6, wherein the elastically deformable element further comprises at least one axial arm which extends between the rings the interior surface of said arms being secured to the member and the exterior surface of said arm being secured to the body so that said arm experiences essentially shear loadings during radial movements of said member.

8. The suspended axle according to claim 7, wherein the elastically deformable element comprises two arms which are diametrically opposed on each side of the member.

9. The suspended axle according to claim 8, wherein the hydroelastic articulation comprises two chambers which are delimited by the arms and the rings.

10. The suspended axle according to claim 4, wherein the elastically deformable element comprises a retaining cage which is overmoulded with an elastic material, said element being secured to the body by the gripping on said cage.

11. The suspended axle according to claim 1, wherein the pivot is rigid with pure free torsion properties.

12. The suspended axle according to claim 1, wherein the pivot comprises at least one articulation comprising an elastically deformable element which element is interposed between a body secured to the arm and a member secured to the wheel carrier.

13. The suspended axle according to claim 12, wherein the elastically deformable element has a generatrix the axis of which is inclined with respect to the axis of rotation of the pivot.

14. The suspended axle according to claim 1, wherein the wheel carrier comprises a rigid mounting plate which bears the axis of the pivot and the axis of the member, said axes being formed one on each side of the attachment means for holding the wheel.

15. The suspended axle according to claim 1 wherein the arm also bears a component adapted to support the shock absorber for the wheel.

16. The suspended axle according to claim 1, wherein the arm comprises a first part and a second part to both of which the means of articulation and the wheel carrier are respectively secured, the beam being secured to the central region of the arm.

17. The suspended axle according to claim 1, wherein the axle is configured in such a way as to exhibit toe-in when the steering device is inactive.

* * * * *